(12) United States Patent
Goryoda et al.

(10) Patent No.: US 7,824,726 B2
(45) Date of Patent: Nov. 2, 2010

(54) METHOD OF MAKING A STERILE BEVERAGE OF A ROASTED MATERIAL

(75) Inventors: Toshio Goryoda, Yokohama (JP);
Yukiko Mizukami, Yokohama (JP);
Eiichi Nozawa, Yokohama (JP); Yuuko Osada, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 653 days.

(21) Appl. No.: 10/499,525

(22) PCT Filed: Jan. 29, 2003

(86) PCT No.: PCT/JP03/00815

§ 371 (c)(1),
(2), (4) Date: Jun. 21, 2004

(87) PCT Pub. No.: WO03/063601

PCT Pub. Date: Aug. 7, 2003

(65) Prior Publication Data
US 2005/0106297 A1 May 19, 2005

(30) Foreign Application Priority Data
Jan. 31, 2002 (JP) .............................. 2002-023109

(51) Int. Cl.
*A23B 5/10* (2006.01)

(52) U.S. Cl. .................... 426/593; 426/425; 426/431; 426/432; 426/435; 426/506; 426/518; 426/595; 426/597

(58) Field of Classification Search .................. 426/593, 426/595, 597, 425, 431, 432, 435, 506, 518
See application file for complete search history.

(56) References Cited

U.S. PATENT DOCUMENTS 2,343,228 A * 2/1944 Sperti ......................... 426/466

(Continued)

FOREIGN PATENT DOCUMENTS

JP    06-141776 A    5/1994

(Continued)

OTHER PUBLICATIONS

Lopez, A., A Complete Course in Canning, Book 1, Publication of "The Canning Trade", Baltimore, MD, pp. 284-296.*

(Continued)

*Primary Examiner*—Helen F Pratt
(74) *Attorney, Agent, or Firm*—Hedman & Costigan, P.C.; James V. Costigan

(57) ABSTRACT

A method of manufacturing a high quality beverage capable of providing beverage by an extraction after roasting the material thereof and filling beverage of a roast material in a container and sealing the container. The method comprises a step for roasting the material in a sterile atmosphere, and extracting the roast material or preparing a suspension of the roast material with sterilized water, wherein sterilized inert gas atmosphere is used as the sterile atmosphere in at least a part of the step, whereby since both the deterioration of quality due to oxidation and the deterioration of quality by heating can be prevented, the high quality beverage of the roast material can be manufactured.

1 Claim, 1 Drawing Sheet

U.S. PATENT DOCUMENTS

| | | | | |
|---|---|---|---|---|
| 3,224,880 | A | * 12/1965 | Van Ike | 426/385 |
| 3,261,689 | A | * 7/1966 | Ponzoni | 426/310 |
| 6,514,552 | B1 | * 2/2003 | Sivetz | 426/393 |
| 6,808,731 | B1 | * 10/2004 | Gutwein et al. | 426/433 |
| 6,821,541 | B2 | * 11/2004 | Lee | 426/435 |
| 6,887,505 | B2 | * 5/2005 | Reaves et al. | 426/115 |
| 2001/0017021 | A1 | * 8/2001 | Sanfilippo et al. | 53/432 |

FOREIGN PATENT DOCUMENTS

| | | |
|---|---|---|
| JP | 09-172968 A | 7/1997 |
| JP | 10-165152 A | 6/1998 |
| JP | 2000-321539 | 9/1998 |
| JP | 2001-231523 A | 8/2001 |
| JP | 2002-065165 A | 3/2002 |

OTHER PUBLICATIONS

PCT Search Report Dated Mar. 4, 2003.
EPC Communication of Jul. 3, 2009.
Derwent XP-002338460 of JP 2000-321539 dated Sep. 18, 1998.
English Abstract of JP2000-093 dated Apr. 4, 2000.
English Abstract of JP 61-41776 dated May 24, 1994.

* cited by examiner

METHOD OF MAKING A STERILE BEVERAGE OF A ROASTED MATERIAL

TECHNICAL FIELD

This invention relates to a method for manufacturing beverage of a roast material in a container by which a material of beverage such as coffee beverage, cocoa beverage and roast barley beverage is roasted and beverage is obtained by extraction or addition of water and then the obtained beverage is filled in a container which is then sealed.

BACKGROUND ART

Various methods have in the past been used and proposed for preventing oxidization of beverage in a container. As to prevention of oxidization of beverage of a roast material, Japanese Patent Application Laid-open Publication Sho 51-57863 proposes, for example, conducting all processes of extraction of beverage from coffee powder, filtering and filling of the beverage in a container and sealing of the container under pressure of inert gas. Japanese Patent Application Laid-open Publication Hei 9-262055 discloses a method for manufacturing coffee contained in a container according to which an empty container is kept in an oxygen-free state in its inside and coffee produced in the presence of inert gas or in an oxygen-free state is filled in this container, whereby all processes from raw material to filling and sealing are conducted in an oxygen-free state.

These prior art method for preventing oxidization of beverage of a roast material in a container in which all processes from extraction of beverage to filling of the beverage in a container and sealing of the container in an oxygen-free state are effective for preventing deterioration of quality of the beverage. In all of these methods, however, beverage must be subjected to sterilization by heating after filling of the beverage in a container and sealing of the container by retort treatment under a temperature from 120° C. to 125° C. for 30 minutes to 40 minutes with resulting disadvantage that this heating deteriorates quality of the beverage and, in the case of coffee, for example, fragrance and taste of just roasted coffee are lost.

DISCLOSURE OF THE INVENTION

Repeated studies and experiments made by the inventors of the present invention have resulted in the finding, which has led to the present invention, that, in manufacturing of coffee beverage, cocoa beverage, barley beverage etc., coffee beans, cocoa beans, barley grains etc. which are raw materials of beverage are heated to a temperature about 200° C. in the roasting process and, at this time, these materials are brought into a sterile state and, by conducting processes after roasting in sterile atmosphere, conducting extraction of the roast material or preparation of a suspension of the roasted material with sterile water and using, at least in a part (preferably all) of these processes, sterile inert gas atmosphere as the sterile atmosphere, deterioration of quality of the beverage due to oxidization can be prevented and, since heating such as retort treatment for sterilizing the beverage is not needed in any process after roasting to completion of the beverage of the roast material in a container, deterioration of quality of the beverage due to heating can also be prevented whereby beverage of a roast material of a high quality can be produced.

For achieving the object of the present invention, a method for manufacturing beverage of a roast material in a container is characterized in that processes from roasting of a material to filling of beverage in a container and sealing of the container are conducted in sterile atmosphere, extraction of the roast material or preparation of a suspension of the roast material is conducted with sterile water and, at least in a part of said processes, sterile inert gas atmosphere is used as the sterile atmosphere.

In one aspect of the invention, the method for manufacturing beverage of a roast material in a container is characterized in that extraction of the roast material or preparation of a suspension of the roast material is conducted with deoxidized sterile water.

According to the present invention, the material is brought into a sterile state by roasting and, by conducting processes after roasting in sterile atmosphere, conducting extraction of the roast material or preparation of a suspension of the roasted material with sterile water and using, at least in a part of these processes, sterile inert gas atmosphere as the sterile atmosphere, deterioration of quality of the beverage due to oxidization and heating can be prevented and beverage of a roast material of a high quality can thereby be produced.

Moreover, by conducting extraction of the roast material or preparation of a suspension of the roast material with deoxidized sterile water, oxidization of the beverage can further be prevented.

DESCRIPTION OF PREFERRED EMBODIMENTS OF THE INVENTION

Figure 1:
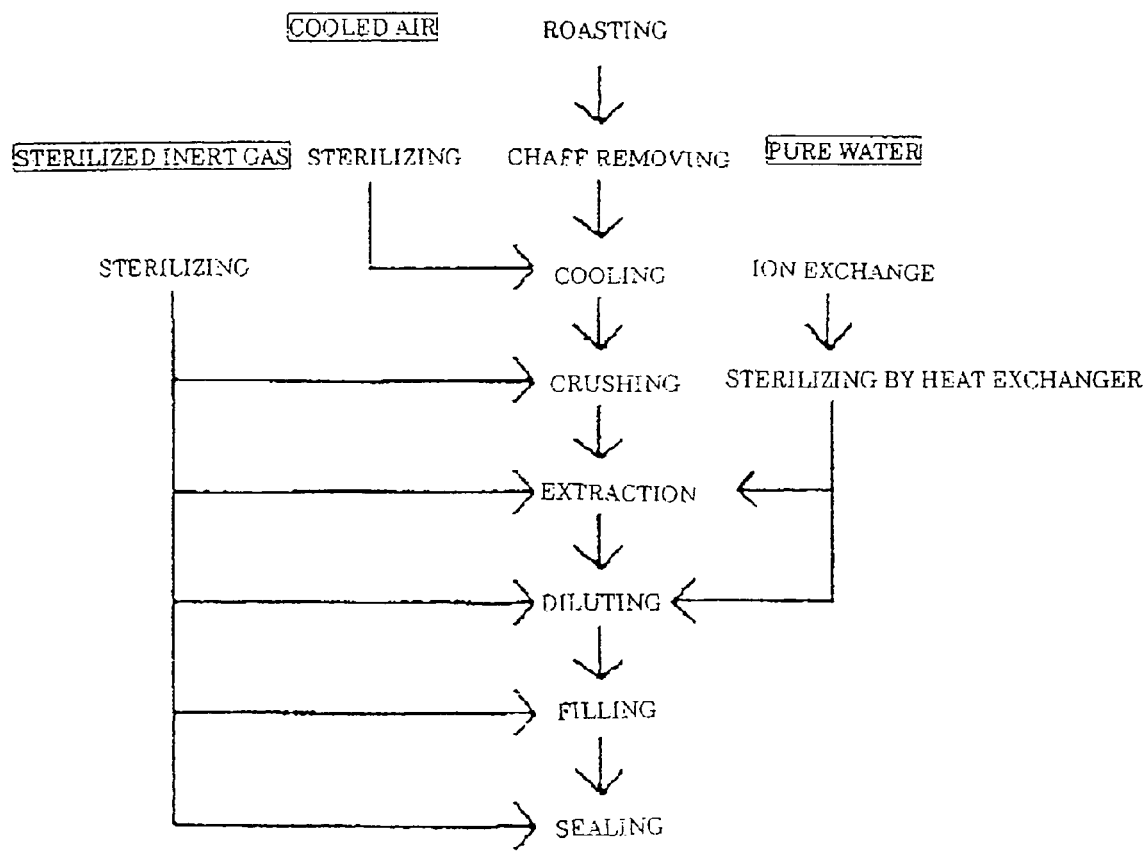
FIG. 1 is a flow chart showing processes of the method for manufacturing beverage of a roast material in a container according to the invention.

The present invention can be applied to a method for manufacturing beverage in a container according to which materials such as coffee beans, cocoa beans and barley grains for beverages such as coffee beverage, cocoa beverage and roast barley beverage are roasted and beverage is extracted from the roast material or a suspension of the roast material is prepared. As to coffee beverage, the present invention can be applied not only to black coffee beverage but also to milk coffee beverage by using UHT milk or long-life milk and also to sweetened coffee beverage by using sterilized sweetener such as syrup which has been sterilized by filtering or the like method.

Conditions for roasting differ depending upon a material used. In the case of coffee beans, roasting is made by heating coffee beans at a temperature within a range from 200° C. to 210° C. for ten minutes to fifteen minutes. This roasting by far exceeds heating conditions of general dry heating sterilization and, as a result, the roast coffee beans are completely sterilized. The same is the case with the other roast materials.

The roast material is conveyed to a next process aseptically while maintaining the sterilized state. In some case, the roast material may be conveyed to a next process after being packed in a sterile state to a sterilized container and the container may be opened in a sterile state in the next process.

Processes for manufacturing the beverage in a container after roasting such as crushing of the roast material are all conducted in a sterile state. More specifically, respective processes using apparatuses such as a crusher which can treat the material under sterile conditions and an extractor which can extract beverage from the roast material under sterile conditions are all conducted in sterile atmosphere such as a cleanroom. In a process for cooling the material after roasting, air which has been sterilized by, for example, filtering through a double HEPA filter is used as cold wind for cooling. Apparatuses such as a crusher and an extractor are treated for necessary initial sterilization by applying known methods such as heating (dry heat sterilization or wet heat sterilization) and gas sterilization.

By using such initially sterilized apparatuses, liquid for beverage is prepared by extracting the roast material in a sterile state with sterile water or a suspension of the roast material is prepared by adding sterile water to the roast material. The sterile water used for extraction or preparation of a suspension is sterilized by suitable means such as heating by a heat exchanger, sterilization by a ultraviolet ray water sterilizer and filtration. Additional materials such as sugar, milk and spices to be added to the beverage are also sterilized by suitable means such as heating and filtration.

The liquid for beverage obtained by extracting the roast material with sterile water or by adding water to the roast material in sterile atmosphere is filled in a sterilized container such as a PET bottle, metal can, pouch, paper cup and plastic cup under sterile conditions and the container is sealed to provide a final beverage product. As an apparatus for achieving filling and sealing in a sterile state, a general aseptic container filling apparatus can be used.

For preventing oxidization of the roast material and liquid for beverage by air in the process after roasting, sterilized inert gas is introduced as sterile atmosphere to respective apparatuses for treating the roast material and liquid for beverage to substitute air and form sterile inert gas atmosphere. Since nitrogen gas is a representative inert gas which is commercially available easily, the following description will be made as using nitrogen gas.

Nitrogen gas can be sterilized by using, for example, a cartridge filter which has been sterilized with steam. For preventing oxidization, it is preferable to form sterile nitrogen gas atmosphere as sterile atmosphere in all processes after roasting. In a case where, depending upon the type of the roast material, complete prevention of oxidization is not necessary, use of the sterile nitrogen gas may be omitted in part of the processes after roasting and sterile atmosphere may be formed by sterile air.

Substitution by nitrogen gas is not performed in the roasting process because if roasting was made in the nitrogen gas atmosphere, taste and fragrance of the roast material would unfavourably change from the original taste and fragrance. In the cooling process, as described previously, sterile nitrogen gas is not used but cold wind of sterilized air is used. This is because the surface area of roast material such as coffee beans is so small that a significant oxidization prevention effect by substitution by nitrogen gas cannot be achieved.

Water used for extracting the roast material, preparing a suspension and diluting liquid for beverage is sterilized before using as described above. Before sterilization, it is preferable to reduce dissolved oxygen in the water for prevention of oxidization by using an apparatus for producing deoxidized water. It is also preferable to fill sterile nitrogen gas in head space of all pipes through which water passes and head space of all tanks in which dilution and mixing are conducted.

In filling liquid for beverage in a container, it is preferable to fill space between a filling nozzle and the container and the inside space of the container with sterilized nitrogen gas.

The process for manufacturing coffee beverage in a container comprises mainly steps of roasting coffee beans, chaff removing, cooling, crushing, extraction of liquid for beverage from powder, dilution of the liquid for beverage, filling of the liquid for beverage in a container and sealing of the container.

It is preferable to perform all these steps except for roasting, chaff removing and cooling in sterile nitrogen gas atmosphere.

In the case of cocoa beverage in a container, the process is different from the coffee beverage in that roast cocoa beans are not extracted after crushing but a suspension of cocoa is prepared by adding water. In the same manner as in the case of coffee beverage, however, it is preferable to perform all steps except for roasting, chaff removing and cooling in sterile nitrogen gas atmosphere.

In the case of roast barley beverage in a container, the process is different from the coffee beverage in that roast barley grains are extracted without being crushed. In the same manner as in the case of coffee beverage, however, it is preferable to perform all steps except for roasting and cooling in sterile nitrogen gas atmosphere.

EXAMPLE

As a typical example of beverage of roast material, an example of the method for manufacturing coffee beverage in a container will now be described.

Outline of the Process

The process for manufacturing coffee beverage in a container comprises mainly, as shown in the chart of FIG. 1, roasting of green coffee beans, chaff removing, cooling, crushing, extraction from powder, dilution of extracted liquid, filling and sealing. As heated water used in extraction and dilution, water which was sterilized by subjecting pure water to ion exchange and sterilization was used. As cold wind used in the cooling process, air which was sterilized by filtration through a double HEPA filter was used. All processes from crushing and extraction to sealing were performed in sterilized nitrogen gas atmosphere. As the nitrogen gas for forming this atmosphere, nitrogen gas which was sterilized through a cartridge filter sterilized with steam was used.

Forming of Sterile, Low Oxygen Concentration Atmosphere

Nitrogen gas which was sterilized through a cartridge filter sterilized with steam was introduced into a crushing apparatus for preventing oxidization of beans or powder under crushing. The roasted and chaff-removed coffee beans were treated from the crushing process in a low oxygen concentration environment produced by substitution of air by sterile nitrogen gas. Air in space between particles of coffee powder introduced into an extractor was already substituted by nitrogen gas. Before the powder was put in the extractor, a step of discharging air with sterile nitrogen gas when the extractor column was empty was inserted. Water used for extraction which was already sterilized by a heat exchanger or a ultraviolet ray water sterilizer was sterilized in a closed environment for maintaining a sterile state. For this purpose, the water was heated for sterilization at a temperature exceeding 130° C. but dissolved oxygen was not removed by this heating. Therefore, as the water for extraction, water in which concentration of dissolved oxygen was reduced by a deoxidized water producing apparatus was used and the desired low oxygen concentration in the extracted liquid was thereby realized. Head space of all pipes through which water passes and head space of all tanks in which dilution and mixing are conducted was filled with sterile nitrogen gas. In the present example, a container in the shape of a plastic cup was used and air in the space between the filling nozzle and the cup and the inside space of the cup was previously substituted by sterile nitrogen gas.

Initial Sterilization

Before starting manufacturing of the coffee beverage in a container, initial sterilization was conducted for respective apparatuses from roasting to filling of the liquid in the container and also conveyors between the respective apparatuses. The initial sterilization was made at 200° C. for 15 minutes in the case of dry heating with gas flame (for chaff removing and cooling) and at 125° C. for 10 minutes in the case of steam sterilization (for crushing, extraction and dilution). Sterilization with a sterilizer (for filling and sealing) was also conducted by using successive scattering or successive wiping off of sodium hypochlorite and 70% ethanol. In this manner, the initial sterile state from the outlet of the roaster to the filling and sealing apparatus was secured. During operation, supply of gas or water was prohibited except that cold wind was supplied through a double HEPA filter in the cooling process after roasting, and sterile nitrogen gas was supplied through a sterilized filter and heated water sterilized by a heat exchanger was supplied to the passing channel of coffee beans and extracted liquid.

Manufacture of Coffee Beverage

After forming the initially sterilized low oxygen concentration environment, 18 kg of green coffee beans were supplied to a continuous roaster at a rate of 300 g per minute. Average dwelling time of the green beans in the roasting zone was about 10 minutes. During the dwelling time, the roasting temperature was changed from 165° C. to 210° C. and the green beans thereby became brown. Survival rate of bacteria on the coffee beans after roasting was measured and it was less than 1 per 1 kg, that is, survived bacteria were substantially undetectable and, therefore, the roast beans were considered to be sterilized. The beans then were crushed by a crusher with the interval of the roll mill being set at 0.2 mm. The extractor was composed of six extracting columns and four extracting columns among them were used for receiving about 3.7 kg of powder for each extracting column and extracting liquid in about 12 minutes. The extracting operation was repeated four times and extracted liquid totaling 250 liter was obtained. Extracting efficiency at this time was 24%. The extracted liquid was transferred to a buffer tank of a filler and filled in plastic cups made of polyester and having capacity of 240 cc by 200 ml per cup. The cups were then sealed. Oxygen concentration in the head space of each cup was 1.4%.

Tasting after Storing

The coffee beverage in a cup thus produced was stored for two weeks at room temperature and then the cup was opened and the beverage was tasted. The coffee beverage maintained fragrance and taste of coffee just after being roasted.

Comparative Examples (1) Sample Made by a General Manufacturing Method

Extracted liquid of coffee was produced according to a general method for manufacturing coffee beverage without performing substitution by nitrogen gas. Since extraction was not made in a sterile state, initial sterilization of the extractor was omitted. Since, in the case of coffee beverage in a plastic cup, means for sterilizing liquid to be filled is a heat exchanger, extracted liquid was sterilized before filling by heating the extracted liquid at 145° C. for 5 seconds by a heat exchanger. A cup and a lid which were sterilized with hydrogen peroxide were used as the container. In this case, a pH adjusting agent such as sodium bicarbonate which was commonly used in the industry was not used.

(2) Sample Made by Low Oxygen Concentration Method

This method was different from the general manufacturing method in that oxygen free water was used as extracting water, air in the head space of a filling tank storing extracted liquid was substituted by nitrogen gas and, immediately before sealing, air in the head space of a plastic cup was substituted by nitrogen gas. Oxygen concentration immediately after sealing was 1.4%.

(3) Sample Made by Aseptic Method

In this method, processes from roasting to sealing were performed in a sterile environment. As a gas for realizing the sterile environment, air which was sterilized through a filter was used. Therefore, sterilization by a heat exchanger was omitted. Substitution of air with nitrogen gas was conducted only for the head space immediately before sealing.

Result of Organoleptic Test

The sample of the Example of the present invention and the three samples of the Comparative Examples, totaling four samples, were stored for fifteen days at 25° C. Then, these samples were evaluated by a panel consisting of five experts who were well acquainted with evaluation of coffee. Results of the evaluation are shown in the following Table 1:

TABLE 1

| Organoleptic Test | | | |
|---|---|---|---|
| Manufacturing method | fragrance | Taste | Total point (full marks: 5) |
| General method | strong, moist scorching smell | sharp acid taste | 3 |
| Low oxygen concentration method | scorching smell | acid taste like formic acid | 4 |
| Aseptic method | oxidized smell | acid taste like formic acid | 4 |
| Example of the present invention | fragrance of roast coffee | acid taste of coffee beans | 5 |

As will be apparent from this table, the method according to the present invention has overcome all of the disadvantages of the prior art methods.

INDUSTRIAL UTILITY

The present invention is applicable to manufacture of beverage of a roast material in a container by which a material of beverage such as coffee beverage, cocoa beverage and roast barley beverage is roasted and beverage is obtained by extraction or addition of water and then the obtained beverage is filled in a container which is then sealed.

The invention claimed is:

1. Method of making a coffee or cocoa beverage consisting of the steps of:
(a) roasting coffee or cocoa beans to form roasted coffee or cocoa beans;
(b) crushing the roasted coffee or cocoa beans;
(c) cooling said roasted and crushed coffee or cocoa beans to form cooled crushed coffee or cocoa with sterilized cold moving air;

(d) extraction of said cooled crushed coffee or forming a suspension of said cooled crushed cocoa to form a beverage;
(e) filling the beverage in a container; and
(f) sealing said container, said method characterized in that the roasted coffee or cocoa beans are conveyed to the crushing process aseptically while maintaining a sterile atmosphere and all steps after roasting of the coffee or cocoa beans to filling of the beverage in the container and sealing of the container are conducted in a sterile atmosphere without interruption of the sterile atmosphere and that extraction of the roast coffee or preparation of the suspension of the roast cocoa is conducted with sterile water and, at least in a part of said steps, a sterile inert gas atmosphere is used as the sterile atmosphere and that all steps after the roasting of the coffee or cocoa beans are conducted without retort treatment under a temperature from +120° C. to 125° C.

* * * * *